United States Patent
Cook et al.

(10) Patent No.: US 6,888,829 B1
(45) Date of Patent: May 3, 2005

(54) METHOD AND SYSTEM FOR PROVIDING REAL-TIME ANNOUNCEMENTS

(75) Inventors: Charles I. Cook, Louisville, CO (US); Guy Wells, Louisville, CO (US)

(73) Assignee: Qwest Communications International Inc., Denver, CO (US)

(*) Notice: Subject to any disclaimer, the term of this patent is extended or adjusted under 35 U.S.C. 154(b) by 0 days.

(21) Appl. No.: 09/479,952

(22) Filed: Jan. 10, 2000

(51) Int. Cl.[7] .............................................. H04L 12/56
(52) U.S. Cl. ....................................... 370/392; 370/394
(58) Field of Search ................................. 370/389, 392, 370/394, 400, 401, 395.42, 474, 476, 338, 487, 352, 410, 522, 354, 356; 379/41, 51, 207.02, 114.15–114.2, 88.17, 900, 76, 77, 80, 88.01, 88.04, 88.05, 88.06, 88.13, 88.12, 88.18, 88.22, 88.23, 88.24; 455/404, 412, 413; 709/238, 246

(56) References Cited

U.S. PATENT DOCUMENTS

| | | | |
|---|---|---|---|
| 5,740,532 A | * | 4/1998 | Fernandez et al. .......... 455/404 |
| 5,805,587 A | * | 9/1998 | Norris et al. ................ 370/352 |
| 5,909,651 A | * | 6/1999 | Chander et al. ............. 455/466 |
| 6,381,316 B2 | * | 4/2002 | Joyce et al. .............. 379/114.2 |
| 6,392,999 B1 | * | 5/2002 | Liu et al. ..................... 370/260 |
| 6,535,743 B1 | * | 3/2003 | Kennedy, III et al. ....... 455/456 |

* cited by examiner

*Primary Examiner*—Chau Nguyen
*Assistant Examiner*—Duc Duong
(74) *Attorney, Agent, or Firm*—Townsend and Townsend and Crew LLP

(57) ABSTRACT

A method and system for generating real-time announcements in a digital packet-switched telecommunications network includes an announcement server for sensing a predetermined trigger event and generating a predetermined announcement for insertion into a data stream. A packet-based network then transmits the packetized announcement along with the current data stream for receipt by the destination. The announcement is then processed by the appropriate processing device, such as a Base Station Controller or a wireless handset, immediately upon receipt of the packetized announcement so that it can be generated in real-time.

26 Claims, 2 Drawing Sheets

METHOD AND SYSTEM FOR PROVIDING REAL-TIME ANNOUNCEMENTS

TECHNICAL FIELD

This invention relates to methods and systems for providing real-time announcements in a digital packet-based telecommunications networks.

BACKGROUND ART

Currently, in order to play announcements, it is required that a telecommunication line, either wireline or wireless, must be bridged, or conferenced, with an announcement circuit. One announcement circuit is required for each line requiring an announcement and is assigned to the line as needed. Since these resources are limited, announcements are performed on a near real-time basis.

Thus, there exists a need to provide these announcements in real-time and with minimum resources.

DISCLOSURE OF THE INVENTION

It is a general object of the present invention to provide a method and system for providing real-time announcements.

In carrying out the above object and other objects, features and advantages of the present invention, a method is provided for generating real-time announcements in a digital packet-based telecommunications network wherein data is transferred from a source to a destination device in packets for receipt by the destination device. The method includes sensing a predetermined trigger event and packetizing the announcement into the data upon sensing the predetermined trigger event. The method also includes transmitting the packetized announcement and processing the packetized announcement for receipt by the destination device.

In further carrying out the above object and other objects, features, and advantages of the present invention, a system is also provided for carrying out the steps of the above described method. The system includes an announcement server for sensing a predetermined trigger event and packetizing a predetermined announcement for insertion into the data upon sensing the predetermined trigger event. The system further includes a packet-based network for transmitting the packetized announcement for receipt by the destination. Still further, the system includes a processing device for processing the packetized announcement for receipt by the destination device.

BEST MODES FOR CARRYING OUT THE INVENTION

Figure 1:
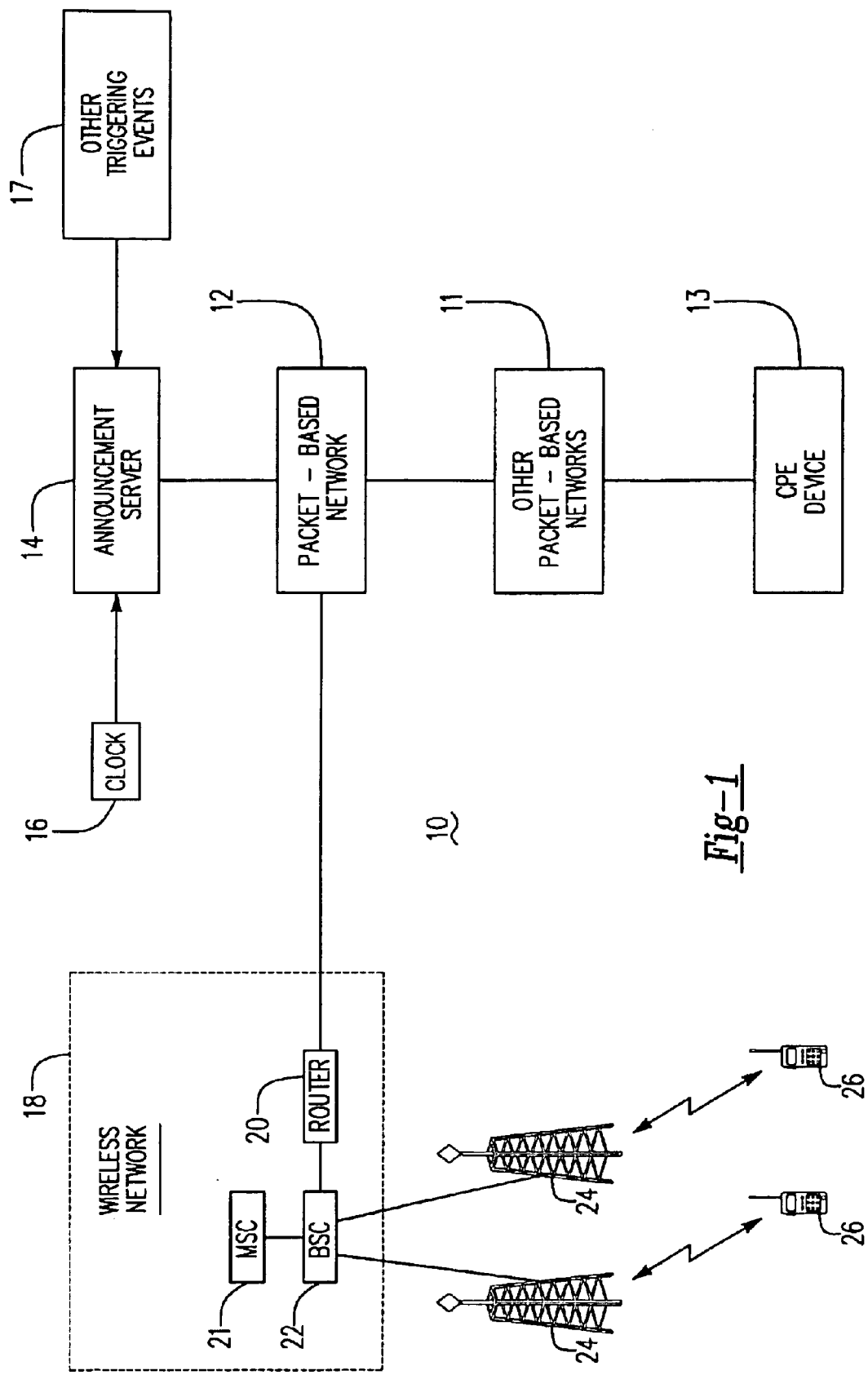
FIG. 1 is a block diagram of a system of the present invention.

The present invention is intended for a packet-based network in which data is transferred from a source to a destination device in packets. Thus, as shown in FIG. 1, the system of the present invention, denoted generally by reference numeral 10, includes a packet-based network 12, such as an IP, ATM, CDMA network or even a wireless network. Still further, the packet-based network may include other types of packet-based access networks 11, such as an Internet Network, that serves CPE (Customer Premise Equipment) devices 13. The network 12 acts as a source for transferring data to the destination devices.

The system 10 further includes an announcement server 14 coupled to the network 12. Announcement server 14 stores prerecorded announcements or predefined synthesized announcements to be generated at predetermined times or in response to predetermined events. For example, announcement server 14 may have stored therein time-related announcements that are triggered by a clock 16. That is, an announcement may be desired to be played at predetermined time intervals, such as 1-minute intervals, for metering purposes.

Alternatively, the announcement stored in announcement server 14 could be triggered by other triggering events 17 including, but not limited to, approaching a zero balance on a pre-paid account, sensing a second call for call-waiting purposes, and invoking features subscribed to by a subscriber of the destination device. As mentioned above, the announcement may be an audible announcement, such as a pre-recorded or synthesized message, or may also include tones, vibrations, graphical/textual messages, or the like, and any combination thereof.

The system 10 further includes a wireless network 18 having a router 20 directly coupled to packet-based network 12 for receiving the packets of data. Within each packet of data there is a header that contains the address of the destination and the address of the source. This permits communication between the source and the destination to insure that the packet is successfully delivered. Also included in the header is time stamp and sequencing information to insure the data is reassembled in the proper order at the destination, and received within delay tolerances for delay sensitive services such as packetized voice.

The wireless network 18 typically includes a Mobile Switching Center (MSC) 21 that serves each coverage area by processing calls to and from the wireless users of the wireless network 18. MSC 21 is known to those skilled in the art as a digital telephone exchange that controls the switching between a wireline network and mobile cell sites for all wireline-to-mobile, mobile-to-wireline, and mobile-to-mobile calls. In operation, when MSC 21 receives a call that is directed to a wireless handset 26, MSC 21 deciphers the telephone number dialed by the originating caller and alerts Base Station Controllers (BSCs) 22 (described below) at one or more cell sites to page the corresponding wireless handset 26. Similarly, when wireless handset 26 places a call, MSC 21 accepts the dialing data from BSC 22 and uses the dialed number for routing the communication. MSC 21 also processes mobile registration status data received from BSC 22, switches calls to other cells, processes diagnostic information, and compiles mobile billing information.

Typical wireless networks include several coverage areas each including multiple adjoining cells. The BSC 22, which operates under the direction of MSC 21, serves each coverage area via a plurality of Base Stations (BSs) 24 disposed throughout each of the adjoining cells. The BSC 22 manages each of the radio channels assigned to its coverage area, supervises calls, turns the radio transceivers on and off, injects data onto control and user channels, and performs diagnostic tests on the cell site equipment. The BSs 24 communicate with the BSC 22 utilizing a packet-based base station protocol.

The present invention operates by adding an overhead indicator to the announcement packets intended to be inserted into the data stream. This indicator resides in the voice and announcement application protocol's header, preceding the data that the voice and announcement applications use. When such a packet is received by the appropriate processing device, such as the BSC 22 or the wireless handset 26 itself, the processing device suspends or buffers the data stream in order to process the announcement packet.

Figure 2:
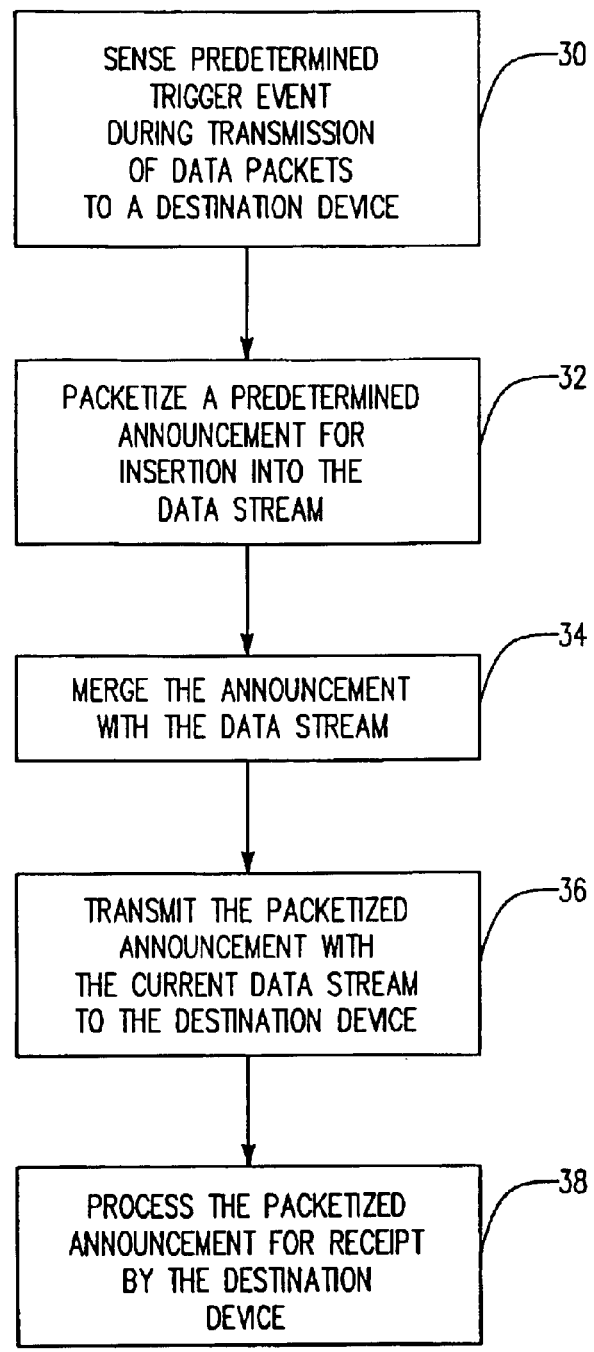
FIG. 2 is a flow diagram illustrating the general sequence of steps associated with the method of the present invention.

Turning now to FIG. 2, there is shown a flow diagram illustrating the general sequence of steps associated with the method of the present invention. The method begins with sensing a predetermined trigger event, as shown at block 30. The predetermined trigger could be time-based events, such as 1-minute intervals, or other events as mentioned above.

The method proceeds to packetize the predetermined announcement for insertion into the data stream upon sensing the predetermined trigger event, as shown at block 32. This includes inserting a priority indicator into the header of the packetized announcement indicating the high priority for the packetized announcement.

The packetized announcement is then merged with the current data stream, block 34, and transmitted with the data for receipt by the destination, as shown at block 36. The packetized announcement is then processed by the appropriate processing device, as shown at block 38. This involves the BSC 22, or the handset 26, suspending processing of the data until the announcement has been played, displayed, etc. If the packetized announcement is merged with the data stream in block 34, then the announcement will be played on top of the data, i.e. the announcement is played with the data. For example, an announcement that a balance on a pre-pad account is approaching zero would be heard by both parties along with the conversation.

Alternatively, the data may be dropped from the transmitted packets so that only the announcement is played, and may also be played to only one of the parties. For example, an announcement of an urgent message or page may be played instead of the data and may be heard by only one of the parties instead of the conversation.

While the best modes for carrying out the invention have been described in detail, those familiar with the art to which this invention relates will recognize various alternative designs and embodiments for practicing the invention as defined by the following claims.

What is claimed is:

1. A method for generating real-time announcements in a digital packet-based telecommunications network wherein data is transferred from a source to a destination in packets for receipt by the destination, and wherein the packets include a header containing address and sequencing information, the method comprising:

sensing a predetermined trigger event;

inserting a priority indicator into the header of a packetized announcement indicating high priority for the packetized announcement;

transmitting the packetized announcement with the data for receipt by the destination upon sensing the predetermined trigger event; and processing the packetized announcement immediately for receipt by the destination in real-time;

wherein processing includes suspending processing of the data until the packetized announcement has been processed.

2. The method as recited in claim 1 wherein transmitting the packetized announcement comprises merging the packetized announcement with the data.

3. The method as recited in claim 1 wherein the announcement is an audible announcement.

4. The method as recited in claim 3 wherein the announcement is a pre-recorded voice announcement.

5. The method as recited in claim 3 wherein the announcement is a synthesized announcement.

6. The method as recited in claim 1 wherein the announcement is a visual announcement.

7. The method as recited in claim 6 wherein the visual announcement is a graphical announcement.

8. The method as recited in claim 6 wherein the visual announcement is a textual announcement.

9. The method as recited in claim 1 wherein the announcement is a vibratory signal.

10. A method for generating real-time announcements in a digital packet-based telecommunications network wherein data is transferred from a source to a destination in packets for receipt by the destination, and wherein the packets include a header containing address and sequencing information, the method comprising:

sensing a predetermined trigger event;

inserting a priority indicator into the header of a packetized announcement indicating high priority for the packetized announcement;

transmitting the packetized announcement with the data for receipt by the destination upon sensing the predetermined trigger event; and processing the packetized announcement immediately for receipt by the destination in real-time;

wherein transmitting the packetized announcement comprises dropping the data and transmitting only the packetized announcement.

11. A method for generating real-time announcements in a digital packet-based telecommunications network wherein data is transferred from a source to a destination in packets for receipt by the destination, and wherein the packets include a header containing address and sequencing information, the method comprising:

sensing a predetermined trigger event;

inserting a priority indicator into the header of a packetized announcement indicating high priority for the packetized announcement;

transmitting the packetized announcement with the data for receipt by the destination upon sensing the predetermined trigger event; and processing the packetized announcement immediately for receipt by the destination in real-time;

wherein sensing the predetermined trigger event includes sensing a predetermined amount of time.

12. The method as recited in claim 11 wherein processing the announcement includes generating an announcement identifying an amount of time elapsed.

13. A system for generating real-time announcements in a digital packet-based telecommunications network wherein data is transferred from a source to a destination in packets for receipt by the destination, and wherein the packets include a header containing address and sequencing information, the system comprising:

an announcement server for sensing a predetermined trigger event and for inserting a priority indicator into the header of a packetized announcement indicating high priority for the packetized announcement;

a packet-based network in communication with the announcement server for transmitting the packetized announcement with the data for receipt by the destination upon the predetermined trigger event being sensed; and a processing device in communication with the packet-based network for receiving and processing the packetized announcement immediately for receipt by the destination in real-time;

wherein the processing device, in processing the packetized announcement, is further operative to suspend processing of the data until the packetized announcement has been processed.

14. The system as recited in claim 13 wherein the packet-based network, in transmitting the packetized announcement, is further operative to merge the packetized announcement with the data.

15. The system as recited in claim 13 wherein the announcement is an audible announcement.

16. The system as recited in claim 15 wherein the announcement is a pre-recorded voice announcement.

17. The system as recited in claim 15 wherein the announcement is a synthesized announcement.

18. The system as recited in claim 13 wherein the announcement is a visual announcement.

19. The system as recited in claim 18 wherein the visual announcement is a graphical announcement.

20. The system as recited in claim 18 wherein the visual announcement is a textual announcement.

21. The system as recited in claim 13 wherein the announcement is a vibratory signal.

22. The system as recited in claim 13 wherein the processing device is a wireless handset.

23. The system as recited in claim 13 wherein the processing device is a component of a wireless network.

24. A system for generating real-time announcements in a digital packet-based telecommunications network wherein data is transferred from a source to a destination in packets for receipt by the destination, and wherein the packets include a header containing address and sequencing information, the system comprising:

an announcement server for sensing a predetermined trigger event and for inserting a priority indicator into the header of a packetized announcement indicating high priority for the packetized announcement;

a packet-based network in communication with the announcement server for transmitting the packetized announcement with the data for receipt by the destination upon the predetermined trigger event being sensed; and a processing device in communication with the packet-based network for receiving and processing the packetized announcement immediately for receipt by the destination in real-time;

wherein the packet-based network, in transmitting the packetized announcement, is further operative to drop the data and transmit only the packetized announcement.

25. A system for generating real-time announcements in a digital packet-based telecommunications network wherein data is transferred from a source to a destination in packets for receipt by the destination, and wherein the packets include a header containing address and sequencing information, the system comprising:

an announcement server for sensing a predetermined trigger event and for inserting a priority indicator into the header of a packetized announcement indicating high priority for the packetized announcement;

a packet-based network in communication with the announcement server for transmitting the packetized announcement with the data for receipt by the destination upon the predetermined trigger event being sensed; and a processing device in communication with the packet-based network for receiving and processing the packetized announcement immediately for receipt by the destination in real-time;

wherein the announcement server, in sensing the predetermined trigger event, is further operative to sense a predetermined amount of time.

26. The system as recited in claim 25 wherein the processing device, in processing the announcement, is further operative to generate an announcement identifying an amount of time elapsed.

* * * * *